(12) United States Patent
Graichen

(10) Patent No.: US 8,618,438 B2
(45) Date of Patent: Dec. 31, 2013

(54) APPARATUS AND METHOD TO MACHINE HOLES

(75) Inventor: Andreas Graichen, Norrköping (SE)

(73) Assignee: Siemens Aktiengesellschaft, München (DE)

( * ) Notice: Subject to any disclaimer, the term of this patent is extended or adjusted under 35 U.S.C. 154(b) by 1128 days.

(21) Appl. No.: 12/291,182

(22) Filed: Nov. 6, 2008

(65) Prior Publication Data

US 2009/0134136 A1 May 28, 2009

(30) Foreign Application Priority Data

Nov. 23, 2007 (EP) .................................... 07022765

(51) Int. Cl.
*B23K 26/00* (2006.01)
*B23K 9/00* (2006.01)

(52) U.S. Cl.
USPC .................................... 219/121.71; 219/69.11

(58) Field of Classification Search
USPC ............... 219/121.7, 121.71, 121.84, 121.85, 219/69.11, 69.17
See application file for complete search history.

(56) References Cited

U.S. PATENT DOCUMENTS

| | | | |
|---|---|---|---|
| 4,762,464 A * | 8/1988 | Vertz et al. ................... | 416/97 R |
| 4,771,157 A * | 9/1988 | Sato et al. ..................... | 219/69.1 |
| 4,808,785 A * | 2/1989 | Vertz et al. ................... | 219/69.17 |
| 4,818,834 A * | 4/1989 | Rupert ......................... | 219/69.17 |
| 4,857,696 A * | 8/1989 | Taeusch et al. .............. | 219/121.7 |
| 5,010,232 A * | 4/1991 | Arai et al. ................... | 219/121.7 |
| 5,084,602 A * | 1/1992 | Gamo et al. ................ | 219/69.12 |
| 5,418,345 A * | 5/1995 | Adamski ..................... | 219/69.17 |
| 6,362,446 B1 * | 3/2002 | Jones et al. ................. | 219/69.11 |
| 6,380,512 B1 * | 4/2002 | Emer .......................... | 219/121.71 |
| 6,680,454 B1 * | 1/2004 | Batzinger et al. ........... | 219/69.15 |
| 6,766,091 B2 * | 7/2004 | Beuth et al. .................. | 385/128 |
| 6,888,097 B2 * | 5/2005 | Batarseh ..................... | 219/121.7 |
| 2003/0004606 A1 * | 1/2003 | Duffin ........................... | 700/193 |
| 2007/0203480 A1 * | 8/2007 | Mody et al. ................... | 606/33 |

FOREIGN PATENT DOCUMENTS

WO WO 90/02020 A1 3/1990

* cited by examiner

*Primary Examiner* — Sang Y Paik

(57) ABSTRACT

The present invention relates to an apparatus for machining holes, especially to machine holes in a surface of a coated gas turbine airfoil, which apparatus comprises a laser device for laser drilling and an electrode for electrical discharge machining. Further the invention relates to a method to machine a hole into a coated surface with an apparatus of the incipiently mentioned type. Known methods make use of a machine with separate machine heads for laser drilling and electrical discharge machining. By combining these two devices in one machine head the invention gives the possibility to save time and obtain very accurate results.

12 Claims, 1 Drawing Sheet

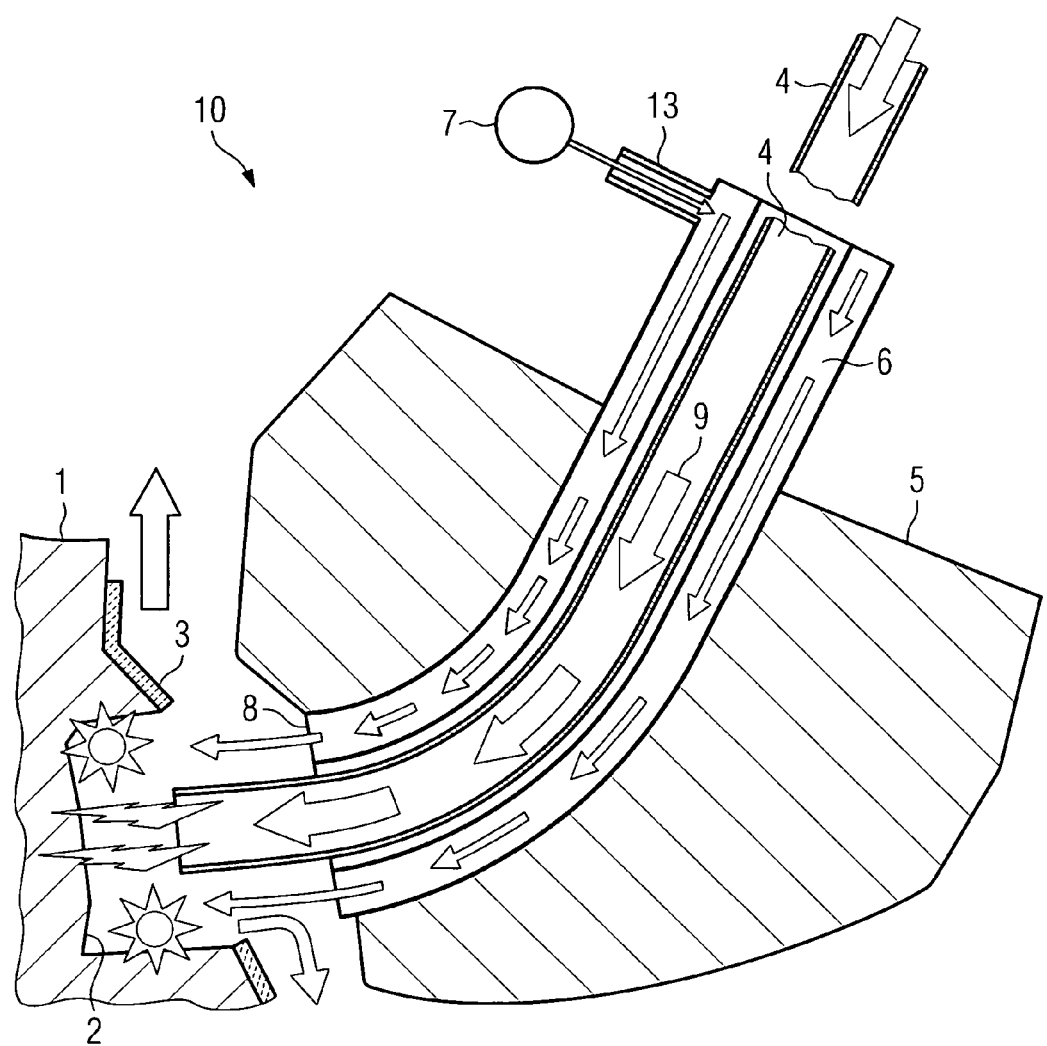

APPARATUS AND METHOD TO MACHINE HOLES

CROSS REFERENCE TO RELATED APPLICATIONS

This application claims the benefits of European application No. 07022765.7 filed Nov. 23, 2007 and is incorporated by reference herein in its entirety.

FIELD OF INVENTION

The present invention relates to an apparatus for machining holes, especially to machine holes in a surface of a coated gas turbine airfoil, which apparatus comprises a laser device for laser drilling and an electrode for electrical discharge machining, wherein the laser device comprises an emission module with an emission surface to emit the laser beam directed in a defined direction. Further the invention relates to a method to machine a hole into a coated surface with an apparatus of the incipiently mentioned type.

BACKGROUND OF THE INVENTION

Machining holes into turbine blades, in particular into cooled gas turbine blades is an extraordinary difficult tasks, since the airfoils of the blades have convex and concave three dimensional surfaces and the optimal thermal boundary layer during gas turbine operation under high temperature requires a very sophisticated distribution and geometry of the holes, through which cooling gas respectively air is supplied to the gas turbine airfoil's surface. The holes, which can barely be named bore holes, often have bended longitudinal extensions and are of any three dimensional shape. Usually either electrical discharge machining or laser beam drilling is applied to obtain the desired shape of the holes. Both methods do have drawbacks and advantages. Conventional electrical discharge machining is not capable to machine holes into ceramic surfaces. Laser drilling has the disadvantage that the laser beam on the one hand might remove material on locations, where material removal is not desired and on the other hand vaporized material can solidify at other locations of the work piece.

The European patent application EP 0 267 718 A2 suggests to combine both manufacturing methods, wherein during a first step holes are drilled in wax filed hollow gas turbine blade by laser drilling and in a second step a diffuser portion of these holes is machined by electrical discharge machining. Furthermore it is proposed to move the electrical discharge machining device and the laser drill device in the same coordinate system for a higher degree of accuracy. One disadvantage of the apparatus and the method according to the European patent application is the necessary adjustment of both devices relative to each other and the common coordinate system. Often even a new alignment might be necessary for each step of the proposed machining procedure. Since each gas turbine blade has a plurality of holes in a very complex distribution the programming of an apparatus for machining the holes is very complicated, time consuming and can be a source of various mistakes.

SUMMARY OF INVENTION

Therefore it is one object of the invention to design an apparatus and a method for machining holes in the above mentioned manner, which guarantees a high degree of accuracy, enables the necessary flexibility in geometry of the holes but simplifies the machining significantly.

It is a further object to reduce the manufacturing costs, especially to reduce the processing time for gas turbine blades and the costs for the machining apparatus.

This object is achieved by an incipiently mentioned type of apparatus, which's laser emission module and which's electrode or a conduct of the electrode are both attached to one common machine head.

The new arrangement according to the invention solves the problem of complexity of the machining since the same machine head positions the laser beam for laser drilling and the electrode for electrical discharge machining at the desired position. Considering a fixed offset between the emission module of the laser device and the electrode the machine head has only to shift always the same offset distance to change the manufacturing tool. Enabling both manufacturing methods with one machine saves significant costs on the one hand for machining equipment and on the other hand for the machining itself since separate alignments for different machining procedures are not necessary.

Preferably the emission module and the electrode or the conduct of the electrode are attached to the machine head in a spatial relation to each other in such a manner that the emission direction of the laser and the electrode or the conduct of the electrode are in a constant spatial offset relation to each other. According to this aspect of the invention the programming of the machining apparatus is simplified and the accuracy of the machining improved.

Significant further advantages can be gained, when the emission module or at least an emission surface of the emission module is ring shaped and the EDM-electrode faces the surface, which is to machine, through the ring. The ring shaped emission module respectively emission surface for the laser beam results in a machining of the surface by the laser beam on the surface in the shape of a closed ring. This leads to the emission module respectively emission surface machining an area, which is surrounding the machining area of the electrode without moving the machine head. This feature enables to remove coating layers from surfaces in a first step and to electric discharge machine the same surface area without moving the machine head. If the diameter of the ring shape is small enough, the coating in the center of the ring is removed by the laser due to the impact of it too depending on the coating material and thickness.

One possibility of implementation of the ring shaped emission module is that the emission module respectively emission surface is an abutting face of a tube, wherein the tube walls are light conductive. The light conductive tube surrounds the electrode and emits the laser beam in such a manner that a ring around the electrode is machined into the surface. This embodiment of the invention enables the implementation of the laser into one common machine head with the electrode without changing conventional electrical discharge machines significantly. The tubular light conductor is just installed into the same nozzle, through which the conventional electrode is let through.

Another preferred embodiment provides a tubular electrode arranged basically through the center or coaxial to the emission surface respectively emission module or the ring shape of the emission module or the emission surface of the tube.

The tube shape of the electrode enables to supply a cooling fluid, preferably water through the tube to the surface, where a high amount of heat is generated during machining.

A first possibility for cooling or purging the location of machining is the supply of a fluid through the center of the tube and a second possibility is to supply the fluid through cooling fluid channels, which are located adjacent, preferably surrounding the light conductive tube.

With further advantage the tube with the emission module is a flexible glass capillary of an outer diameter between 0.5 mm and 1 mm and an inner diameter between 0.01 mm and 0.95 mm. The flexibility of the glass capillary simplifies the implementation of the invention in conventional electrical discharge machines since this glass capillary can follow the bending of the electrode to 30 degree. Further the ranges of diameters are suitable for conducting the preferably tubular electrode through the glass capillary.

Another advantageous aspect of the invention is achieved, when an orifice, through which the electrode and the emission module face the surface, which is to machine, is made of metal instead of an insulating material. When the light conductive material of the tube of the laser device is electically insulating material, the orifice—respectively the nozzle—can be made of a material, which is electrically conductive. This reduces the machining costs additionally.

One preferred embodiment of the invention uses a neodymium-doped yttrium aluminium garnet ($Nd:Y3Al_5O_{12}$). Such a laser type is known to be suitable for laser drilling.

Still another preferred embodiment of the invention provides a light conductive adapter between a laser light source and the light conductive tube. Another possibility to supply the laser light into the light conductive tube is to direct the laser beam consecutively from one circumferential position to other circumferential positions to guarantee a harmonious impact on the surface on the hole circumference of the ring shape.

According to another aspect of the invention a method to make a hole into a coated surface with an apparatus of the incipiently mentioned type is proposed comprising the follow steps:

The surface coating is removed by a laser, wherein the laser beam is conducted to the surface by a light conductor, which is positioned next to an electrode for electrical discharge machining, which is retracted from the surface during the first step.

After removal of the coating the laser is switched off and

The electrode is approached to the surface and the hole is machined by electrical discharge machining.

This method has basically the same advantages as the usage of the apparatus of the above mentioned type. The retraction of the electrode during the laser drilling follows the purpose to avoid any negative influence of the presense of the electrode to the result of the laser drilling.

BRIEF DESCRIPTION OF THE DRAWINGS

The above mentioned attributes and an other features and advantages of this invention and the manner of attaining them, will become more aparent and the invention itself will be better understood by reference to the follow description of embodiments of the invention taken in conjunction with an acompaning drawing, wherein FIG. 1 shows a schematic depiction of an apparatus according to the invention and machining a hole into a surface according to a method according to the invention.

DETAILED DESCRIPTION OF INVENTION

FIG. 1 shows the main components of an apparatus 10 to machine a hole into a surface 1 according to the invention. The surface 1 is part of a non-further depicted gas turbine blade airfoil with a ceramic coating layer 3 on the surface 1. In a first step of the method according to the invention laser light from a laser 7 enters a light conductive tube 6 through an optical adapter 13. The optical adapter 13 distributes the laser light harmonically over the whole circumference of the light conductive tube 6. The laser light leaves the light conductive tube 6 at an emission module 8 respectively emission surface of the light conductive tube 6. The emission module 8 is directed to an area of the surface 1, where a ceramic coating 3 is removed.

An electrode 4 of diameter dy1 of tubular shape is led through the inner diameter of the light conductive tube 6. During the first step this electrode 4 is retracted. After finishing of the first step respectively the removal of the coating layer 3 the laser 7 is switched of and the electrode 4 is approached to the surface 1. The hole 2 of the desired shape is machined by electric discharge machining, during which the electrode 4 is partly consumed but supplied from a not shown reservoir. The machining with the tubular electrode 4, which is set under high voltage, generates significant heat and frees eroded particles, which are removed by a purging and cooling fluid 9 supplied through the hollow inner diameter of the electrode tube.

Optional further purging fluid 9 can be supplied through a non-further depicted channel adjacent to the light conductive tube. The light conductive tube and the electrode are both attached to a machine head 5, which is made of metal. Since the light conductive tube 6 is also an electrical insulator, no electrical current can enter the machine head 5 from the electrode 4. The light conductive tube 6 is made of glass having an outer diameter of approximately 0.5 and an inner diameter of 0.3 and which is flexible, so that it can follow the bending of the electrode respectively the curvature of the guiding duct of the machine head 5 (such glass tubes are available from 'Polymicro technologies, LLC, Phoenix, Ariz. 85023-1200 USA'). The tubular electrode 4 and the light conductive tube 6 are basically arranged coaxial, so that no offset of the machine head 5 is necessary when switching from one machining mode to the other machining mode at the same location of the surface 1.

While the present invention has been described as having a preferred design, it can be further modified within the spirit and the scope of this disclosure. This application is therefore intended to cover any variations, uses or adoptions of the invention using its general principles. Further, this application is intended to cover such departures from the present disclosure as come with a known or customer practice in the art, to which this invention pertains.

The invention claimed is:

1. An apparatus for machining holes in a surface of a coated gas turbine airfoil, comprising:
    a laser device for laser drilling having an emission module, the emission module comprising an emission surface to emit the laser beam in a defined direction; and
    an electrode operable for carrying out electrical discharge machining on the surface, wherein the emission module and at least a part of the electrode are attached to one machine head in a fixed spatial relation to each other, such that the emission direction of the laser has a constant spatial offset with respect to the electrode, and
    wherein the emission surface of the emission module is ring shaped and the part of the electrode is coaxially disposed within the ring and facing the surface to be machined, wherein the part of the electrode is movable within the emission module.

2. The apparatus according to claim 1, wherein the emission module is an abutting face of a tube, wherein the tube walls are light conductive.

3. The apparatus according to claim 2, wherein the electrode is a tube arranged essentially through the center or coaxial to the ring shape of the emission module.

4. The apparatus according to claim 3, further comprising a purging device which supplies a purging fluid to the location of machining.

5. The apparatus according to claim 4, wherein the purging device comprises an arrangement for conducting purging fluid through the center of the electrode to the location of machining.

6. The apparatus according to claim 5, wherein the purging device further comprises an arrangement for supplying purging fluid through a fluid cooling channel located adjacent to the light conductive tube.

7. The apparatus according to claim 2, wherein the light conductive tube with the emission module is a flexible glass capillary having an outer diameter between 0.5 and 1.0 mm and an inner diameter between 0.01 mm and 0.95 mm.

8. The apparatus according to claim 3, wherein the electrode has an outer diameter between 0.5 mm and 1 mm.

9. The apparatus according to claim 3, wherein the apparatus comprises an orifice through which the electrode and the emission module face the surface to machine, wherein the orifice is made of metal.

10. The apparatus according to claim 9, wherein the laser is a neodymium-doped yttrium aluminium garnet laser.

11. The apparatus according to claim 2, further comprising an optical adapter that distributes laser light harmonically over the circumference of the light conductive tube.

12. A method to make a hole into a coated surface using a single machine head that incorporates a laser emission module and an electrode for electrical discharge machining, the laser emission module having a ring-shaped emission surface, wherein the electrode is disposed in a coaxial and movable manner within the emission module, the method comprising:
  removing a portion of the surface coating by a laser beam, wherein the laser beam is directed to the surface by the emission module, wherein the electrode is withdrawn from the surface during the coating removal;
  switching off the laser after removal of the coating layer;
  moving the electrode within the emission module for positioning the electrode adjacent to the surface and above the area of the removed coating, without moving the machine head; and
  machining the hole by electrical discharge machining.

* * * * *